(12) United States Patent
Jung (10) Patent No.: US 6,769,171 B2
(45) Date of Patent: Aug. 3, 2004

(54) BOLSTER ASSEMBLY JIG SYSTEM FOR VEHICLE

(75) Inventor: Youn-Kyoung Jung, Ulsan (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 10/271,957

(22) Filed: Oct. 16, 2002

(65) Prior Publication Data

US 2003/0070277 A1 Apr. 17, 2003

(30) Foreign Application Priority Data

Oct. 16, 2001 (KR) .......................................... 2001-63651

(51) Int. Cl.⁷ ............................................... B23P 19/00
(52) U.S. Cl. ......................... 29/700; 29/281.1; 29/559; 29/721; 29/33 K; 269/909; 248/346.03
(58) Field of Search ............................... 29/281.1, 559, 29/700, 721, 33 K, 428; 269/909; 248/129, 346.03

(56) References Cited

U.S. PATENT DOCUMENTS

| | | | | |
|---|---|---|---|---|
| 2,428,958 A | * | 10/1947 | Bohaboy et al. | ............ 408/97 |
| 3,149,825 A | * | 9/1964 | Watkins | ...................... 432/231 |
| 5,123,695 A | * | 6/1992 | Kanemitsu et al. | .... 296/193.09 |
| 5,174,004 A | * | 12/1992 | King et al. | .................... 29/251 |
| 5,664,311 A | * | 9/1997 | Banks et al. | ............. 29/407.04 |
| 6,205,638 B1 | * | 3/2001 | Yustick | ........................ 29/464 |
| 6,282,769 B1 | * | 9/2001 | Longo et al. | ................. 29/417 |
| 6,629,354 B1 | * | 10/2003 | Kline | ........................... 29/559 |
| 6,640,408 B2 | * | 11/2003 | Hedley et al. | ............. 29/281.1 |
| 2002/0073529 A1 | * | 6/2002 | Yustick | ........................ 29/453 |
| 2003/0019090 A1 | * | 1/2003 | Matsumoto et al. | .......... 29/428 |
| 2003/0150094 A1 | * | 8/2003 | Tashiro et al. | ................ 29/428 |

FOREIGN PATENT DOCUMENTS

| | | | | |
|---|---|---|---|---|
| DE | 3724279 A1 | * | 2/1989 | ........... B62D/65/00 |
| EP | 1270387 A1 | * | 1/2003 | ........... B62D/65/00 |
| EP | 1279587 A2 | * | 1/2003 | ........... B62D/65/00 |
| GB | 2035942 A | * | 6/1980 | ........... B65G/47/82 |
| JP | 7069244 A | * | 3/1995 | ........... B62D/25/08 |
| JP | 2284057 A | * | 10/2002 | ........... B62D/65/00 |
| JP | 3040161 A | * | 2/2003 | ........... B62D/65/00 |
| JP | 2003095011 A | * | 4/2003 | ............ B60Q/1/00 |

* cited by examiner

Primary Examiner—Essama Omgba
(74) Attorney, Agent, or Firm—Morgan Lewis & Bockius LLP (57) ABSTRACT

The bolster assembly jig system is provided that includes a lower support, left and right fixed supports mounted on the lower support, and upper and lower horizontal bars extending between the left and right fixed supports to interconnect the same. Left and right lower fixing templates are mounted on the lower support to support a bolster assembly. Bumper beam fixing templates are formed on the left and right fixing supports to support a front bumper rail. Left and right upper fixing templates are provided above the upper horizontal bar for supporting a radiator support upper center panel. A lower clamping unit is provided on the lower horizontal bar to support the front bumper rail, and an upper clamping unit is mounted on the upper horizontal bar and connected through a template fixing arm to the left and right upper fixing templates to enable operation of the same.

10 Claims, 6 Drawing Sheets

BOLSTER ASSEMBLY JIG SYSTEM FOR VEHICLE

FIELD OF THE INVENTION

The present invention relates to a bolster assembly jig system for a vehicle. More particularly, the present invention relates to a jig system in which the bolster assembly is fixedly supported to enable precise assembly of various front-end parts such that assembly errors are minimized and productivity of the vehicle assembly line is increased.

BACKGROUND OF THE INVENTION

Generally, parts comprising a front portion of a vehicle are mounted to a bolster assembly, which is connected to a vehicle frame. The molded bolster assembly is typically connected to a vehicle frame in a vehicle assembly line, and front-end parts received as individual units are each separately mounted to the bolster assembly in a design line.

The front-end parts of a vehicle include a complete radiator support (headlight support panel, radiator support member, etc.), a cooling module (radiator, condenser, fan, radiator reservoir, hoses, etc.), a front bumper rail and an upper support bracket, left and right headlight assemblies, a hood latch and a release cable, a horn (dual horn), and four hood over-slam bumpers. Each of these parts is mounted to a bolster assembly, which is mounted to the vehicle frame in the design line, to realize a vehicle front-end assembly.

To minimize in-line assembly processes in an automobile mass-production plant, modularization has been used. With respect to front ends, either a front-end assembly module is received in an assembled state from a supplier for use in the main line, or front-end parts of the vehicle are assembled into module units to one side of the main line then supplied to the same. As a result, parts are integrated in module units then assembled to the vehicle frame such that transfers of parts in the plant are reduced and the number of assembly processes in the main line is also reduced.

In order to modularize the front-end parts of a vehicle and mount the same to the vehicle frame as described above, the front-end parts are pre-assembled to the bolster assembly. However, as a result of the significant weight of the bolster assembly, it is difficult for a worker to lift the bolster assembly and mount parts to the same. Therefore, a number of workers are needed to place the bolster assembly and to precisely mount various interrelated parts. This increases manufacturing time such that the productivity of the vehicle assembly line is reduced.

SUMMARY OF THE INVENTION

In a preferred embodiment, the present invention includes a lower support formed by the interconnection of a plurality of beam members. Left and right fixed supports are mounted in an upright position on ends of one of the beam members of the lower support. Upper and lower horizontal bars extend between the left and right fixed supports, spaced apart along their length and interconnecting the left and right fixed supports. Left and right lower fixing templates are mounted on the beam members of the lower support that contact the ends of the beam member on which the left and right fixed supports are mounted. The left and right lower fixing templates support left and right lower ends of a bolster assembly. Bumper beam fixing templates are formed at a center of one side of each of the left and right fixing supports to support a left and right portion of one side of a front bumper rail mounted on the bolster assembly. Left and right upper fixing templates are provided above the upper horizontal bar for supporting left and right upper ends of a radiator-support, upper-center panel of the bolster assembly. A lower clamping unit is provided in a center portion on one side of the lower horizontal bar to support a center portion of one side of the front bumper rail, which is mounted to the bolster assembly. An upper clamping unit is mounted on the upper horizontal bar and connected to the left and right upper fixing templates through a template fixing arm to enable operation of the left and right upper fixing templates.

In a further preferred embodiment of the present invention, the left and right lower fixing templates have surfaces corresponding to the shape of the left and right lower ends of the bolster assembly contacting the left and right lower fixing templates. Preferably, the bumper beam fixing templates each have an indentation portion at a distal end thereof, the indentation portions corresponding to an external curved shape of the front bumper rail. Also preferably, the left and right upper fixing templates have surfaces corresponding to the left and right upper ends of the radiator upper center panel of the bolster assembly contacting the left and right upper fixing templates.

In a further alternative embodiment of the present invention, the lower clamping unit includes a lower link bracket mounted to extend upwardly on the center portion of one side of the lower horizontal bar. A first lower link bar has a first end hingedly connected to a first side of a distal end of the lower link bracket. A lower rotating handle is fixedly connected to a second end of the first lower link bar. A second lower link bar has a first end hingedly connected to a center of the first lower link bar. A third lower link bar has a center portion hingedly connected to a second end of the second lower link bar and a first end hingedly connected to a second side on the distal end of the lower link bracket. A bumper beam fixing pin is mounted to a second end of the third lower link bar through a connecting bar.

In a further preferred embodiment of the invention, the upper clamping unit includes an upper link bracket mounted to extend upwardly on one side of a center portion of the upper horizontal bar. A first upper link bar has a first end hingedly connected to a first side of a distal end of the upper link bracket. An upper rotating handle is fixedly mounted to a second end of the first upper link bar. A second upper link bar has a first end hingedly connected to a center portion of the first upper link bar. A third upper link bar has a center portion hingedly connected to a second end of the second upper link bar, and a first end hingedly connected to a second side of the distal end of the upper link bracket. A connecting bar interconnects a second end of the third upper link bar and the template fixing arm.

In a further preferred embodiment of the present invention, a plurality of wheels are connected to a bottom surface of the lower support.

In a further alternative embodiment of a bolster assembly jig according to the invention, a base member carries a frame extending upward from the base member. At least one bumper beam support is mounted on the frame. The bumper beam support is configured and dimensioned to support a bumper beam positioned on the jig. At least one radiator support is mounted on the frame above the bumper beam support. The radiator support is configured and dimensioned to support a radiator portion of the bolster assembly. At least one bolster support is mounted on the base member below the bumper beam support, the bolster support being configured and dimensioned to support a lower surface of the bolster assembly. In a further preferred embodiment, at least one lower clamping unit is mounted on the frame below the bumper beam support. The clamping unit is configured to support a center portion of a front bumper rail of the bolster assembly. Additionally, at least one upper clamping unit is mounted on the frame and supporting said radiator support.

More preferably, the lower clamping unit comprises a bracket mounted on the frame and locking assembly pivotably mounted on the bracket. A bumper beam fixing pin is carried by the locking assembly opposite the bracket. Also, the upper clamping unit comprises a bracket mounted on the frame and a locking assembly pivotably mounted on the bracket. A fixing arm is carried by the locking assembly, the fixing arm supporting the radiator support.

In another aspect of the invention, a method for assembling a modular front end of a vehicle is provided. The method according to one embodiment of the invention comprises providing a bolster assembly jig, mounting a front bumper rail on the assembly jig, positioning a bolster assembly on the frame adjacent the front bumper rail, securing the bumper rail to the bolster assembly, assembling front end parts of the vehicle to the bolster assembly, and removing the bolster assembly from the jig. The method may further comprise supporting a center portion of the front bumper rail; and supporting a center panel of a radiator support comprised in the bolster assembly.

Preferably, assembling front end parts comprises mounting a cooling module on the bolster assembly, mounting a hood latch and release cable on the bolster assembly, and mounting a horn on the bolster assembly. More preferably, the mounting steps are performed in this order. Assembling of front end parts may additionally comprise mounting headlight assemblies to the bolster assembly and mounting a hood over-slam bumper to the bolster assembly.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

Preferred embodiments of the present invention will now be described in detail with reference to the accompanying drawings.

Figure 6:
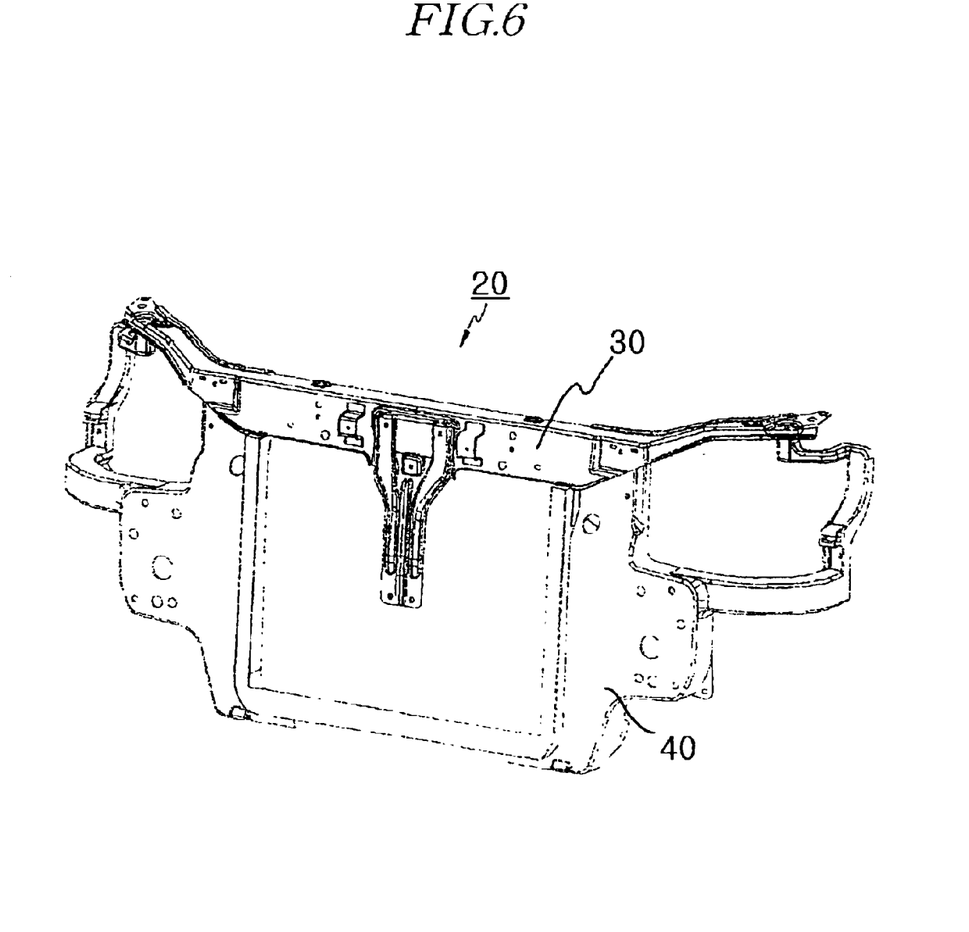
FIG. 6 is a perspective view of a bolster assembly that is fixedly supported by a bolster assembly jig system according to a preferred embodiment of the present invention.

In a bolster assembly jig system according to a preferred embodiment of the present invention, rather than receiving individual front-end parts and assembling them separately to a bolster assembly, the parts are received from a supplier in a modularized manner then mounted to the bolster assembly, after which the resulting module is supplied to a main line to thereby enable integral assembly in modular units. With reference first to FIG. 6, a bolster assembly 20 fixedly supported by a preferred embodiment of the present invention includes a bolster 40 functioning as a main panel to enable mounting of front-end parts, which have a predetermined shape and are injection-molded to modularize the same, and a radiator-support, upper-center panel 30 connected to an upper portion of the bolster 40 to support a radiator mounted to the bolster 40.

A bolster assembly jig system according to a preferred embodiment of the present invention fixedly supports the bolster assembly 20 to enable mounting and modularizing of front-end parts to the bolster assembly 20. The front-end parts generally include a cooling module (radiator, condenser, fan, radiator reservoir, hoses, etc.), a front bumper rail and an upper support bracket, a hood latch and a release cable, a dual horn, left and right headlight assemblies, and four hood over-slam bumpers.

Figure 1:
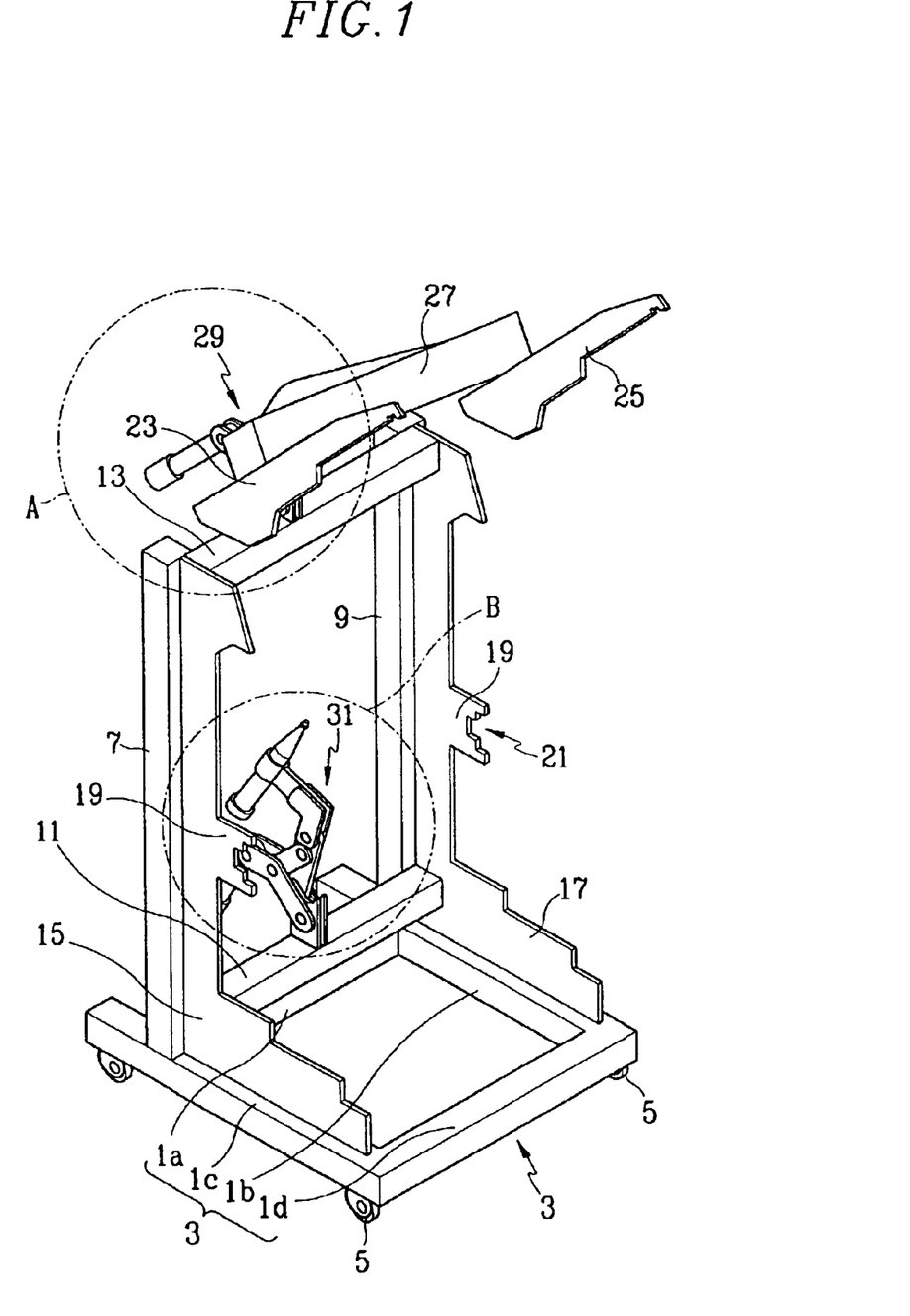
FIG. 1 is a perspective view of a bolster assembly jig system according to a preferred embodiment of the present invention.
Figure 2:
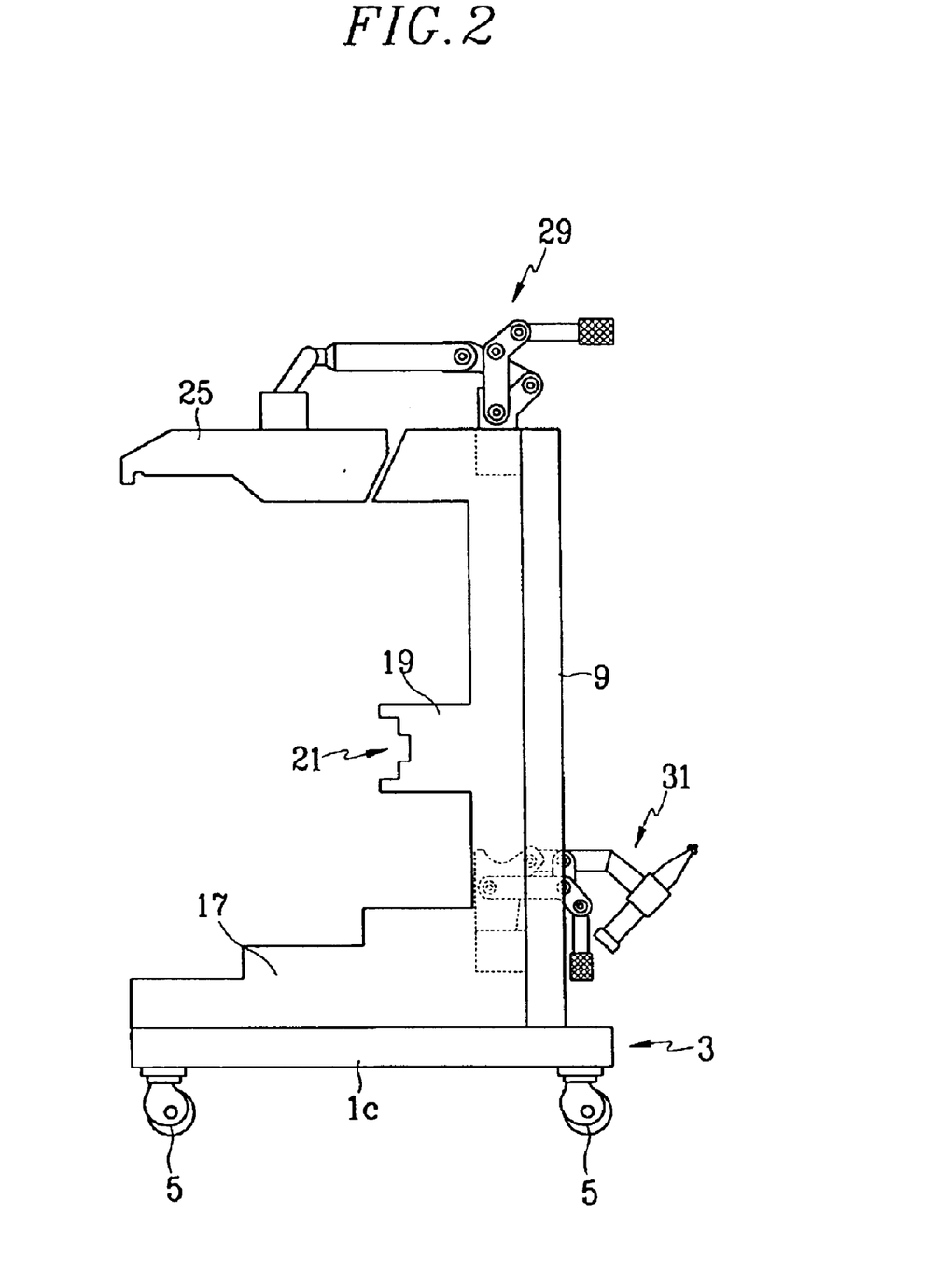
FIG. 2 is a side view of a bolster assembly jig system of FIG. 1.

The bolster assembly jig system, with reference to FIGS. 1 and 2, includes four beam members 1a, 1b, 1c, and 1d that are connected to form a lower support 3. Wheels 5 are preferably connected to a bottom surface of the lower support 3 in the corners. For example, the wheels 5 may be fixed to the bottom surface of the lower support 3 where the beam members 1a, 1b, 1c, and 1d are interconnected.

Left and right fixed supports 7 and 9 are mounted in an upright position on the lower support 3. More specifically, the left fixed support 7 is mounted on the beam member 1c at one end of the beam member 1a and the right fixed support 9 is mounted on the beam member 1b at an opposite end of the beam member 1a. The left and right fixed supports 7 and 9 may overlap corresponding ends of the beam member 1a. The left and right fixed supports 7 and 9 are interconnected at upper portions and lower portions respectively through upper and lower horizontal bars 13 and 11.

Further, left and right lower fixing templates 15 and 17 are respectively mounted on the beam members 1c and 1b, which the beam member 1a interconnects. Surfaces are formed on the lower fixing templates 15 and 17 that correspond to a lower surface formation of the bolster assembly 20 to enable left and right lower ends of the bolster assembly 20 to be supported.

In addition, a bumper beam fixing template 19 that extends in a forward direction is formed to one side of a center portion of each of the left and right fixed supports 7 and 9.

The bumper beam fixing templates 19 each include an indentation portion 21, which corresponds to an external curved shape of a front bumper rail (not shown) to support left and right portions of the front bumper rail, which is mounted to the bolster assembly 20.

Left and right upper fixing templates 23 and 25 are connected to an upper clamping unit 29 through a template fixing arm 27, the upper clamping unit 29 being mounted on the upper horizontal bar 13. As a result, the left and right upper fixing templates 23 and 25 are provided over the upper horizontal bar 13. The left and right upper fixing templates 23 and 25 respectively support left and right ends of the radiator support upper center panel 30 of the bolster assembly 20. Lower portions of the left and right upper fixing templates 23 and 25 correspond to an upper surface of the radiator support upper center panel 30.

Figure 3A:
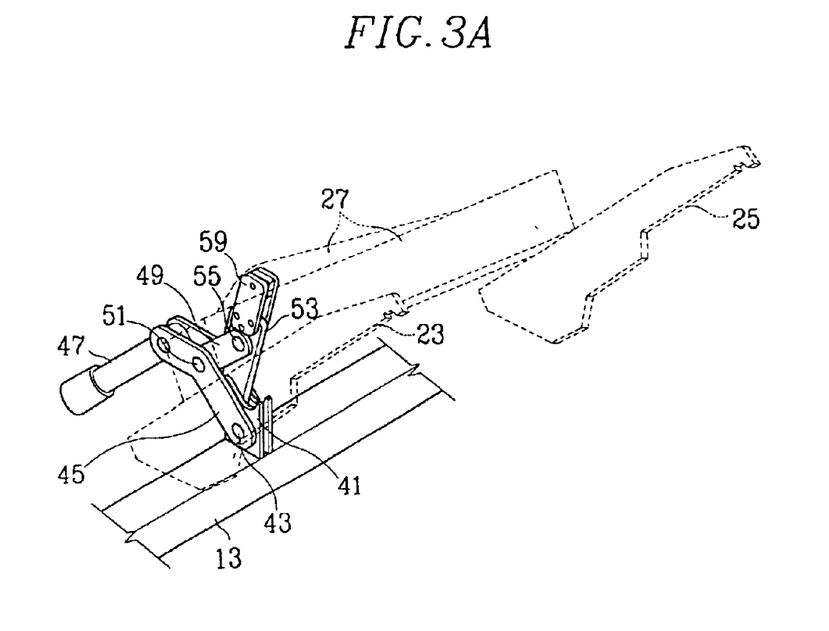
FIGS. 3a and 3b are enlarged perspective views of section A of FIG. 1.
Figure 3B:
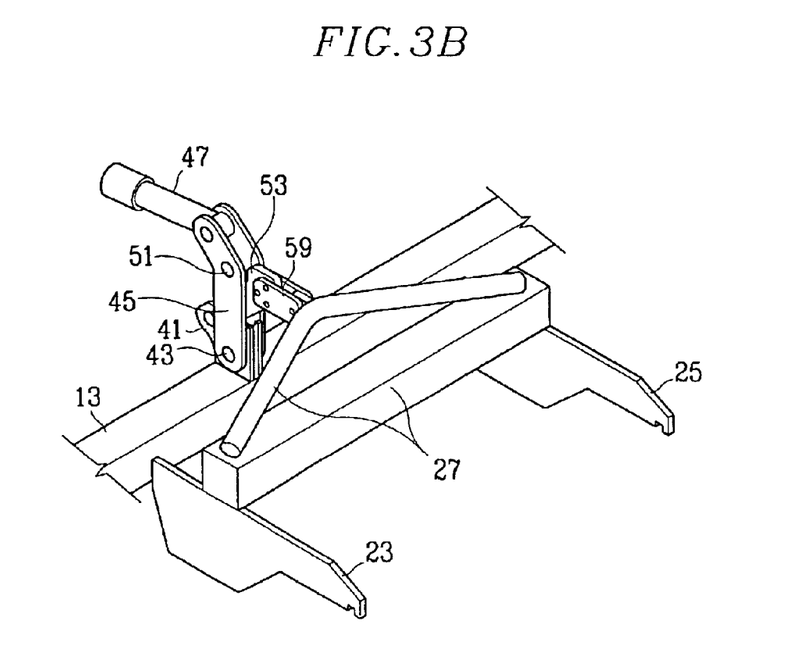

The upper clamping unit 29, with reference to FIGS. 3a and 3b, includes an upper link bracket 41 mounted to extend upwardly at a center of an upper face of the upper horizontal bar 13. Upper clamping unit 29 also includes a first upper link bar 45, a lower end of which is connected to the upper link bracket 41 through a first hinge 43. An upper rotating handle 47 is fixedly mount to an upper end of the first upper link bar 45, and one end of a second upper link bar 49 is connected at a center portion of the first upper link bar 45 through a second hinge 51.

A middle portion of a third upper link bar 53 is connected at an end of the second upper link bar 49 opposite the end connected to the first upper link bar 45 through a third hinge 55. One end of the third upper link bar 53 is connected to an upper portion of the upper link bracket 41 through a fourth hinge 57. An opposite end of the third upper link bar 53 and the template fixing arm 27 are interconnected through a connecting bar 59.

Figure 4:
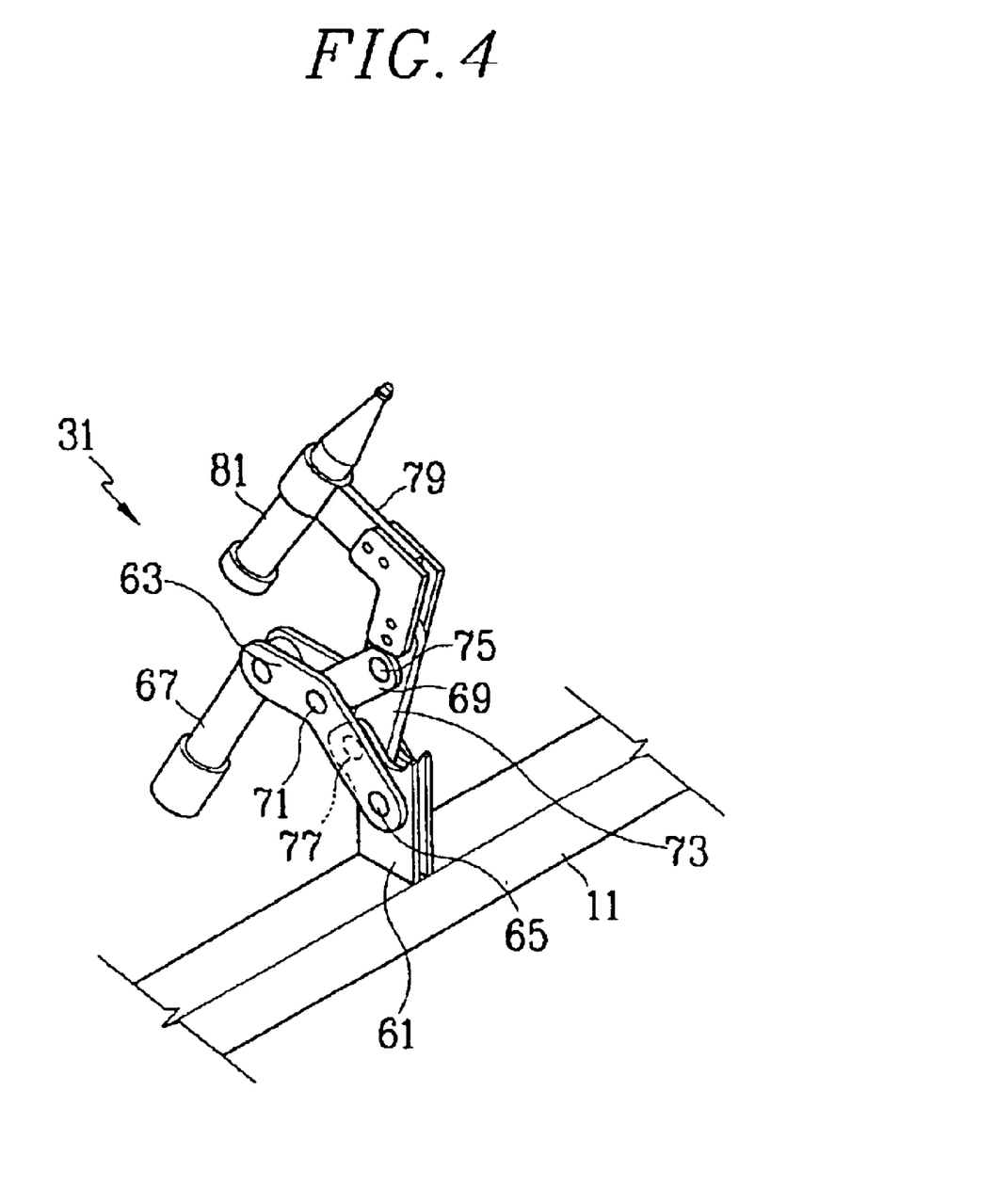
FIG. 4 is an enlarged perspective view of section B of FIG. 1.

Referring back to FIGS. 1 and 2 and to FIG. 4, a lower clamping unit 31 is mounted extending upwardly on an upper surface of a center portion of the lower horizontal bar 11. The lower clamping unit 31 supports a center portion of the front bumper rail (not shown) that is mounted to the bolster assembly 20. The lower clamping unit 31, with reference to FIG. 4, includes a lower link bracket 61 mounted extending upwardly on the upper surface of the center portion of the lower horizontal bar 11.

A lower end of a first lower link bar 63 is connected through a fifth hinge 65 to one side of the lower link bracket 61 on an upper end thereof. A lower rotating handle 67 is fixedly connected to an upper end of the first lower link bar 63.

Further, one end of a second lower link bar 69 is connected to a center portion of the first lower link bar 63 through a sixth hinge 71, and a center of a third lower link bar 73 is connected to an opposite end of the second lower link bar 69 through a seventh hinge 75. One end of the third lower link bar 73 is connected to the upper end of the lower link bracket 61 through an eighth hinge 77, and a bumper beam fixing pin 81 is connected to an opposite end of the third lower link bar 73 through a connecting bar 79.

Figure 5:
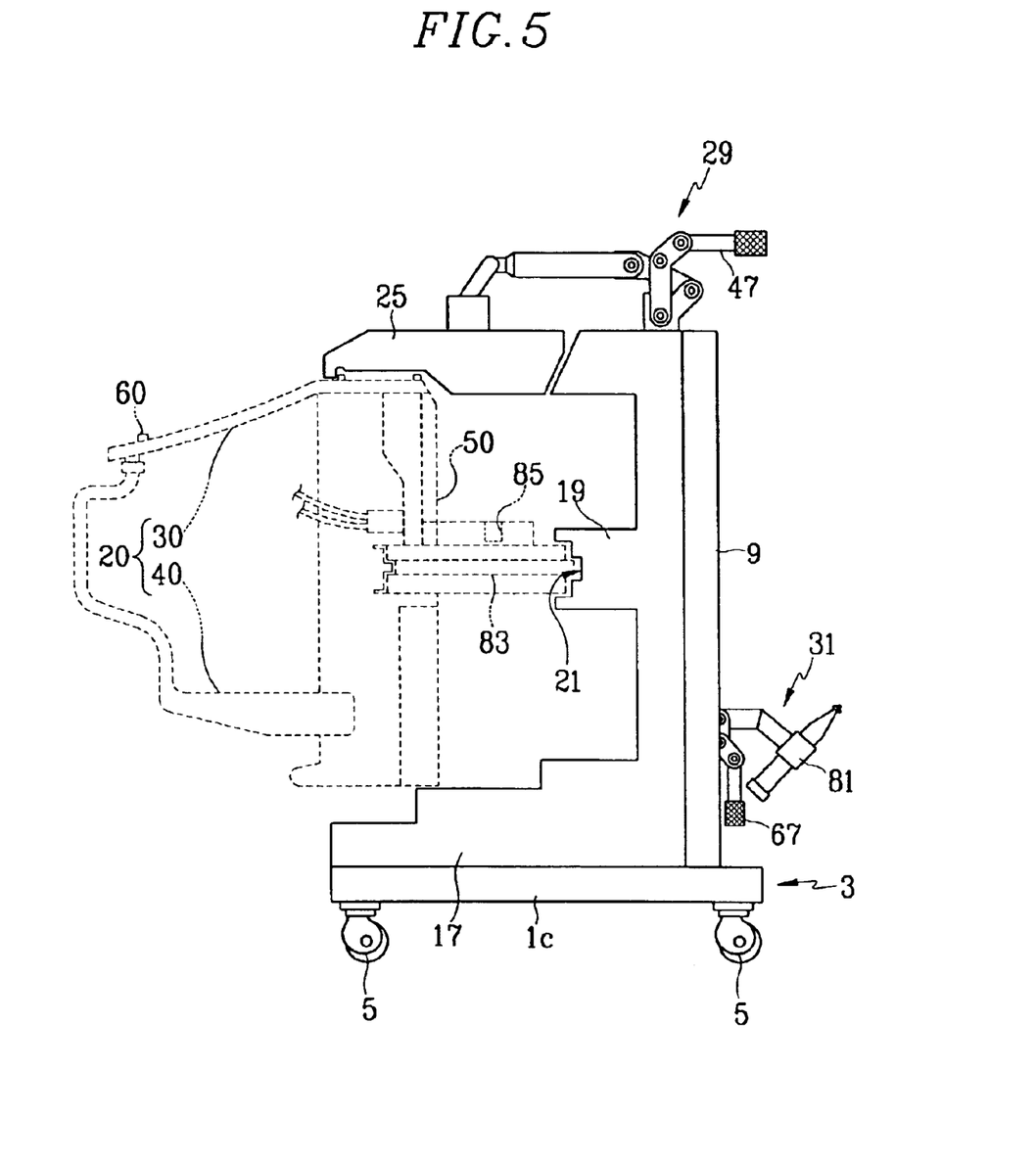
FIG. 5 is a side view of the bolster assembly jig system of FIG. 1 in a state of operation.

Using the bolster assembly jig system described above to fixedly support the bolster assembly 20 as shown in FIG. 5, front-end parts of a vehicle are assembled to obtain a front-end assembly module. That is, before attachment to the vehicle frame, the bolster assembly 20 is fixed onto the bolster assembly jig system according to the preferred embodiment of the present invention.

In more detail, a front bumper rail 83 is first inserted in the bumper beam fixing templates 19 at the indentation portions 21, then the lower rotating handle 67 of the lower clamping unit 31 is rotated. By the resulting linked operation of the lower first, second, and third link bars 63, 69, and 73, the bumper beam fixing pin 81 supports a center portion of the front bumper rail 83.

Next, in a state where a center support panel 85 is fixed to the front bumper rail 83, the bolster assembly 20 is positioned on the left and right lower fixing templates 15 and 17 then the upper rotating handle 47 of the upper clamping unit 29 is rotated. By the resulting linked operation of first, second, and third upper link bars 45, 49, and 53, the left and right upper fixing templates 23 and 25 are downwardly re-positioned such that the radiator support upper center panel 30 is supported. Hence, the bolster assembly 20 is fixedly supported by the bolster assembly jig system according to the preferred embodiment of the present invention.

In this state, a worker is able to easily assemble the vehicle front-end parts to increase assembly efficiency. An assembly process in which front-end parts of a vehicle are modularized on a bolster assembly fixedly supported on the bolster assembly jig system according to the preferred embodiment of the present invention includes mounting a cooling module 50, a hood latch and a release cable (not shown), and a dual horn (not shown) to the bolster assembly 20, in this order. The dual horn is mounted separately to the bolster assembly 20 using bolts.

Subsequently, left and right headlight assemblies (not shown) are mounted to the bolster assembly 20, then finally a hood over-slam bumper 60 is mounted to the bolster assembly 20. The hood over-slam bumper 60 is separately provided to an upper part of the radiator support upper center panel 30.

Through these processes, a plurality of front-end parts for a vehicle are mounted to the bolster assembly 20 to realize a bolster assembly module.

In the bolster assembly jig system for vehicles according to the preferred embodiment of the present invention described above, front-end parts mounted to the bolster assembly are mounted in module units to reduce the number of main line processes and end item parts.

Further, this allows the quality of assembly between parts to be examined such that assembly defects in the main line can be reduced, the transfer of parts in the main line can be reduced, and additional main line side materials space may be used. Overall, to reduce in-line assembly processes in a vehicle mass-production plant, the bolster assembly is fixed to enable precise assembly of various front-end parts that are modularized such that assembly errors are minimized and a productivity of a vehicle assembly line is increased.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A bolster assembly jig system, comprising:
   a lower support formed by the interconnection of a plurality of beam members;
   left and right fixed supports mounted in an upright position on ends of one of the beam members of the lower support;
   upper and lower horizontal bars, the upper horizontal bar extending between the left and right fixed supports and the lower horizontal bar extending between the left and right fixed supports at a predetermined distance along a length of the left and right fixed supports from the upper horizontal bar, the upper and lower horizontal bars interconnecting the left and right fixed supports;
   left and right lower fixing templates mounted on the beam members of the lower support that contact ends of the beam member on which the left and right fixed supports are mounted, the left and right lower fixing templates supporting left and right lower ends of a bolster assembly;
   bumper beam fixing templates formed at a center of one side of each of the left and right fixing supports to support a left and right portion of one side of a front bumper rail mounted on the bolster assembly;
   left and right upper fixing templates provided above the upper horizontal bar for supporting left and right upper ends of a radiator support upper center panel of the bolster assembly;

a lower clamping unit provided at a center portion on one side of the lower horizontal bar to support a center portion of one side of the front bumper rail mounted to the bolster assembly; and an upper clamping unit mounted on the upper horizontal bar and connected to the left and right upper fixing the plates through a template fixing arm to enable operation of the left and right upper fixing templates.

2. The bolster assembly jig system of claim 1, wherein the left and right lower fixing templates have surface corresponding to a formation of the left and right lower ends of the bolster assembly contacting the left and right lower fixing templates.

3. The bolster assembly jig system of claim 1, wherein the bumper beam fixing templates each have an indentation portion at a distal end thereof, the indentation portions corresponding to an external curved shape of the front bumper rail.

4. The bolster assembly jig system of claim 1, wherein the left and right upper fixing templates have surfaces corresponding to the left and right upper ends of the radiator upper center panel of the bolster assembly contacting the left and right upper fixing templates.

5. The bolster assembly jig system of claim 1, wherein the lower clamping unit comprises:

a lower link bracket mounted extended upwardly on a center portion of one side of the lower horizontal bar;

a first lower link bar, first end of which is hingedly connected to a first side of a distal end of the lower link bracket;

a lower rotating handle fixedly connected to a second end of the first lower link bar;

a second lower link bar, a first end of which is hingedly connected to within a center of the first lower link bar;

a third lower link bar, a center portion of which is hingedly connected to within a second end of the second lower link bar, and a first end of which is hingedly connected to a second side on the distal end of the lower link bracket; and a bumper beam fixing pin mounted to a second end of the third lower link bar through a connecting bar.

6. The bolster assembly jig system of claim 1, wherein the upper clamping unit comprises:

an upper link bracket mounted extended upwardly on one side of a center portion of the upper horizontal bar;

a first upper link bar, a first end of which is hingedly connected to a first side of a distal end of the upper link bracket;

an upper rotating handle fixedly mounted to a second end of the first upper link bar;

a second upper link bar, a first end of which is hingedly connected to within a center portion of the first upper link bar;

a third upper link bar, a center portion of which is hingedly connected to within a second end of the second upper link bar, and a first end of which is hingedly connected to a second side of the distal end of the upper link bracket; and a connecting bar inter connecting a second end of the third upper link bar and the template fixing arm.

7. The bolster assembly jig system of claim 1, wherein a plurality of wheels are connected to a bottom surface of the lower support.

8. A bolster assembly jig, comprising:

a base member;

a frame extending upward from the base member;

at least one bumper beam support mounted on the frame, said bumper beam support configured and dimensioned to support a bumper beam positioned on the jig;

at least one radiator support mounted on the frame above said bumper beam support;

the radiator support configured and dimensioned to support a radiator portion of the bolster assembly;

at least one bolster support mounted on the base member below said bumper beam support, the bolster support being configured and dimensioned to support a lower surface of the bolster assembly;

at least one lower clamping unit mounted on the frame below said bumper beam support, said at least one lower clamping unit configured to support a center portion of a front bumper rail of the bolster assembly; and at least one upper clamping unit mounted on the frame and supporting said at least one radiator support.

9. The bolster assembly jig of claim 8, wherein said at least one lower clamping unit comprises:

a bracket mounted on the frame;

a locking assembly pivotably mounted on the bracket; and a bumper beam fixing pin carried by the locking assembly opposite the bracket.

10. The bolster assembly jig of claim 8, wherein said at least one upper clamping unit comprises:

a bracket mounted on the frame;

a locking assembly pivotably mounted on the bracket; and a fixing arm carried by the locking assembly, said fixing arm supporting said at least one radiator support.

* * * * *